(12) United States Patent
Takamura et al.

(10) Patent No.: US 9,657,112 B2
(45) Date of Patent: May 23, 2017

(54) CO-AGGLOMERATED LATEX POLYMER DISPERSIONS AND METHODS OF PREPARING AND USING SAME (75) Inventors: Koichi Takamura, Penn Valley, CA (US); Kostas S. Avramidis, Charlotte, NC (US)

(73) Assignee: BASF SE, Ludwigshafen (DE)

( * ) Notice: Subject to any disclaimer, the term of this patent is extended or adjusted under 35 U.S.C. 154(b) by 1088 days.

(21) Appl. No.: 13/379,824

(22) PCT Filed: Jul. 1, 2010

(86) PCT No.: PCT/EP2010/059327
§ 371 (c)(1),
(2), (4) Date: Dec. 21, 2011

(87) PCT Pub. No.: WO2011/000897
PCT Pub. Date: Jan. 6, 2011

(65) Prior Publication Data
US 2012/0090781 A1 Apr. 19, 2012

Related U.S. Application Data (60) Provisional application No. 61/222,700, filed on Jul. 2, 2009.

(51) Int. Cl.
*C08L 9/00* (2006.01)
*C08C 1/07* (2006.01)
(Continued)

(52) U.S. Cl.
CPC .................. *C08C 1/07* (2013.01); *C08J 3/215* (2013.01); *C08K 3/346* (2013.01)

(58) Field of Classification Search
CPC ....................................................... C08C 1/07
(Continued)

(56) References Cited

U.S. PATENT DOCUMENTS

| 6,127,461 A | 10/2000 | Takamura et al. |
| 6,300,392 B1 | 10/2001 | Takamura et al. |
| (Continued) | | |

FOREIGN PATENT DOCUMENTS

| DE | 103 49 060 | 10/2004 |
| WO | WO 02/24759 | 3/2002 |
| WO | WO 03/000760 | 1/2003 |

OTHER PUBLICATIONS

Gao et al, Structure and properties of star-shaped solution polymerized styrene-butadiene rubber/nano-SiO2 co-agglomerate composites, 2006, China Synthetic Rubber Industry, 29, 3, p. 230.*

(Continued)

*Primary Examiner* — Timothy Kennedy
(74) *Attorney, Agent, or Firm* — Oblon, McClelland, Maier & Neustadt, L.L.P.

(57) ABSTRACT

Co-agglomerated dispersions and methods for their preparation are described herein. The co-agglomerated dispersions are prepared by co-agglomerating an anionic polymer dispersion and inert particles. The polymers for use in the co-agglomerated dispersions are derived from one or more monomers including at least one conjugated diene monomer. The inert particles have a particle size of less than 2 μm. Also described herein is an aqueous dispersion including co-agglomerated particles formed from at least one polymer and at least one inert material. Further described herein are foamed polymers, latex-based adhesives, waterproofing membranes, sound absorbing coatings, and methods for their preparation and use.

21 Claims, 6 Drawing Sheets

(51) Int. Cl.
  *C08J 3/215* (2006.01)
  *C08K 3/34* (2006.01)
(58) Field of Classification Search
  USPC .......................................................... 156/334
  See application file for complete search history.

(56) References Cited

U.S. PATENT DOCUMENTS

| | | |
|---|---|---|
| 6,348,525 B1 | 2/2002 | Takamura et al. |
| 6,646,086 B2 | 11/2003 | Slone |
| 6,737,469 B2 | 5/2004 | Takamura et al. |
| 6,759,463 B2 | 7/2004 | Lorah et al. |
| 6,765,049 B2 | 7/2004 | Lorah et al. |
| 6,838,507 B2 | 1/2005 | Chou et al. |
| 6,914,095 B2 | 7/2005 | Lorah et al. |
| 7,094,830 B2 | 8/2006 | Xue et al. |
| 7,211,613 B2 | 5/2007 | Lorah et al. |
| 7,250,460 B1 | 7/2007 | Takamura |

OTHER PUBLICATIONS

Liu et al, Properties of vulcanized rubber nanocomposites filled with nanokaolin and precipitated silica, 2007, Applied Clay Science, 42, pp. 232-237.*

English machine translation of DE 10349060, retrieved from EPO Jan. 9, 2017.*

Blackley, D.C., "Agglomeration and Concentration of Synthetic Latices," Polymer Latices: Science and Technology, Second Edition, vol. 2, pp. 260-293, (1997).

"Preparation of Solutions, Dispersions and Emulsions," High Polymer Latices, Chapter 3, pp. 133-154, (1966).

International Search Report Issued Nov. 12, 2010 in PCT/EP10/59327 Filed Jul. 1, 2010.

D.C. Blackley, "Polymer Latices: Science and Technology, Chapter 10.4, Agglomeration and Concentration of Synthetic Latices," Chapman & Hall, London (1997).

D.C. Blackley, "High Polymer Latices, Chapter 3, Agglomeration and Concentration of Synthetic Latices," Maclaren, Palmerton (1966).

Peter Hugener, Peter Burri, "A New Coating Ground Calcium Carbonate for Enhanced Paper Properties," OMYA, Plüss-Staufer AG, Oftringen/Switzerland.

J. Hibbs, "Styrene-Butadiene Rubbers," The Vanderbilt Rubber Handbook, 13$^{th}$ Ed., 54-79, 1990.

ASTM International, Designation: D 1417-03a "Standard Test Methods for Rubber Latices—Synthetic" Nov. 2, 2003.

Qing-Xiu Jia, You-Ping Wu, Yan-Li Xu, Hui-Hui Mao, and Li-Qun Zhang, "Combining In-Situ Organic Modification of Montmorillonite and the Latex Compounding Method to Prepare High-Performance Rubber-Montmorillonite Nanocomposites", Macromol. Mater. Eng. 291:218-226 (2006).

L. Zhang, Y. Wang, Y. Wang, Y. Sui, and D. Yu, Morphology and mechanical properties of clay/styrene/butadiene rubber nanocomposites, J. Appl. Polym. Sci. 78, 1873-1878, 2000.

Y. Wang, L. Zhang, C. Tang, D. Yu, Preparation and characterization of rubber-clay nanocomposites, J. Appl. Polym. Sci., 78, 1879-1883, 2000.

S. Varghese, J. Karger-Kocsis, Natural rubber-based nanocomposites by latex compounding with layered silicates, Polymer 44, 4921-4927, 2003.

S. Varghese, J. Karger-Kocsis, Melt-compounded natural rubber nanocomposites with pristine and organophilic layered silicates of natural and synthetic origin, J. Appl. Polym. Sci., 91, 813-819, 2004.

Y. Wang, H. Zhang, Y. Wu, J. Yang, L. Zhang, Preparation, structure, and properties of novel rectorite/styrene-butadiene copolymer nanocomposite, J. Appl. Polym. Sci. 96, 324-328, 2005.

Y.P. Wu, Y.Q. Wang, H.F. Zhang, Y.Z. Wang, D. S. Yu, L.Q. Zhang, J. Yang, Rubber-pristine clay nanocomposites prepared by co-agglomerating rubber latex and clay aqueous suspension, Comp. Sci. Tech., 65, 1195-1202, 2005.

S. Chakraborty, R. Sengupta, S. Dasqupta, R. Mukhopadhyay, S. Bandyopadhyay, M. Joshi, S. C. Ameta, Synthesis and characterization of styrene butadiene rubber-bentonite clay nanocomposites, Polym. Eng. Sci., 1279-1290, 2009.

A. Mousa, J. Karger-Kocsis, Rheological and thermodynamical behavior of styrene/butadiene rubber-organoclay nanocomposites, Macromol. Mater. Eng., 286, 260-266, 2001.

S. Sadhu, A. Bhowmick, Preparation and Properties of Nanocomposites Based on Acrylonitrile-Butadiene Rubber, Styrene-Butadiene Rubber, and Polybutadiene Rubber, J. of Poly. Sci.: Part B.: Poly. Phys., 42:1573-1585 (2004).

\* cited by examiner

CO-AGGLOMERATED LATEX POLYMER DISPERSIONS AND METHODS OF PREPARING AND USING SAME

BACKGROUND

Latex polymers are useful in the production of several products, including binders for filler particles in paper coating, carpet backing, paints, foams, and adhesives. The mechanical properties of these products can be improved through the addition of inorganic materials to the dispersions or resultant products. Typically, these inorganic materials are added to the dispersion prior to being used in the resultant products. Although there have been attempts to add the inorganic material during the polymerization reaction to form a dispersion consisting of polymer-inorganic hybrid particles, these processes have also required difficult and time consuming treatment processes to use the inorganic material during the polymerization process.

For example, clay-rubber nanocomposites have been developed by various methods, including in-situ solution polymerization and co-coagulating a rubber latex and a clay aqueous dispersion. In the solution polymerization process, the polymer is dissolved into an organic solvent, i.e. toluene. Separately, a clay that has been modified to be organophilic is dispersed in another organic solvent, i.e. alcohol. A desired amount of the clay dispersion is poured into the polymer solution under agitation. The solution is then dried under vacuum to remove the organic solvent to prepare the polymer/clay composite.

In the co-coagulation method, a modified organophilic clay is dispersed in water and added into the polymer dispersion (latex). After vigorous stirring, the mixture is co-coagulated by addition of the electrolyte solution (i.e. 2% sulfuric acid solution). The resultant coagulum is washed with water and dried.

In these processes, the clay surface needs to be pretreated to be organophilic so the clay particles dispersed into the aqueous phase of the polymer dispersion can be incorporated into the bulk polymer phase to produce the clay/rubber polymer nanocomposite. One drawback of these processes is that natural, hydrophilic clay particles cannot be used. For example, in the co-coagulation process, the natural, hydrophilic clay particles would simply coagulate by themselves and form macroscopic separate phases during the coagulation process. Furthermore, these processes produce dry rubber solids which limit the industrial applications where these nanocomposites can be used. These solids are especially difficult to use in adhesives, foams, asphalt emulsions, and other applications.

SUMMARY

Co-agglomerated dispersions and methods for their preparation are described. The co-agglomerated dispersions are prepared by co-agglomerating an anionic polymer dispersion and inert particles. The polymers for use in the co-agglomerated dispersions are derived from one or more monomers including at least one conjugated diene monomer. The inert particles can have a particle size of less than 2 µm. In some embodiments, the inert particles have a particle size ranging from 50 nm to 2 µm. The inert particles can be inorganic particles. For example, the inorganic particles can include one or more clays. The inorganic particles can include one or more particles having platelet structures (e.g., kaolin, mica, bentonite, natural and synthetic hectorite, ettringite, calcium phosphate, and mixtures thereof). In some examples, the inorganic particles include kaolin. The inert particles can be provided in a slurry.

The co-agglomerating step can further include providing the inorganic particles in an amount of from 1% to 50% by weight based on the dry weight of the polymer (e.g., 10% by weight based on the dry weight of the polymer). The method can also include the step of adding a cationic surfactant to the co-agglomerated dispersion to make the polymer dispersion cationic.

The polymer for use in the methods described herein is derived from one or more monomers, wherein at least 50% of the monomers comprise the at least one conjugated diene. In some examples, the at least one conjugated diene monomer includes butadiene. The one or more monomers can include at least one vinyl aromatic monomer (e.g., styrene). The one or more monomers can include at least one (meth) acrylic acid ester (e.g., methyl methacrylate). In some examples, the polymer is polybutadiene.

The methods described herein can further include the step of polymerizing the one or more monomers using emulsion polymerization to form the anionic polymer dispersion prior to the co-agglomerating step. The polymerizing step can occur at a temperature below room temperature. The methods described herein can also include the step of removing water from the co-agglomerated dispersion to produce a solids content of greater than 50% (e.g., 50% to 75% or 55% to 72.5%) or greater than 60% (e.g., 60%-70%).

The co-agglomerating step can include co-agglomerating the anionic copolymer dispersion and the slurry using freeze agglomeration, pressure agglomeration, mechanical agitation, by adding a chemical to the anionic copolymer dispersion and the slurry, or combinations of these methods. In some examples, the co-agglomerating step results in a polymer dispersion wherein the co-agglomerated particles have a particle size of 100 nm to 5 µm.

Also described is an aqueous dispersion including co-agglomerated particles formed of at least one polymer and at least one inert material. The co-agglomerated particles have a particle size of 100 nm to 5 µm. The at least one polymer is derived from one or more monomers including at least one conjugated diene monomer. In some examples, the aqueous dispersion has a surface tension of less than 45 mN/m. In some examples, the solids content of the aqueous dispersion described herein is greater than 50% or greater than 60%. In some embodiments, the solids content is greater than 60% and the viscosity is less than 1 Pa·s at 20° C.

The inert material of the aqueous dispersion described herein can be an inorganic material, e.g., in the form of inorganic particles. The inorganic material can include one or more clays. The inorganic material can also include one or more particles having platelet structures (e.g., kaolin, mica, bentonite, natural and synthetic hectorite, ettringite, calcium phosphate, and mixtures thereof). In some examples, the inorganic material includes kaolin. The inert material is present in the co-agglomerated particles in an amount of from 1% to 50% by weight, based on the dry weight of the polymer in the co-agglomerated particles. The aqueous anionic dispersion described herein can be further transformed to a cationic dispersion by adding a cationic surfactant and reducing the pH of the dispersion.

The polymer for use in the aqueous dispersions described herein can be derived from one or more monomers, wherein at least 50% of the monomers comprise the at least one conjugated diene. In some examples, the at least one conjugated diene monomer includes butadiene. In some examples, the one or more monomers include at least one vinyl aromatic monomer (e.g., styrene). In some examples, the one or more monomers can include at least one (meth) acrylic acid ester (e.g., methyl methacrylate). In some examples, the polymer is polybutadiene.

Further described herein are foamed polymers, latex-based adhesives, and methods for their preparation and use. Included herein are foamed polymers, the foamed polymer comprising an expanded foam produced from co-agglomerated particles formed of at least one polymer and at least one inert material, the co-agglomerated particles having a particle size of 100 nm to 5 µm and the polymer derived from one or more monomers including at least one conjugated diene monomer. The foamed polymer includes a substantially uniform distribution of the inert material throughout.

Also described herein is a method for producing a foamed polymer, comprising co-agglomerating an anionic polymer dispersion, the polymer derived from one or more monomers including at least one conjugated diene monomer and in the presence of inert particles having a particle size of less than 2 µm to form a co-agglomerated dispersion comprising the anionic polymer and particles; introducing air or other gases into the polymer dispersion to form a foamed dispersion; molding the foam dispersion; solidifying or setting the foam dispersion to form the polymer foam; and cross-linking the co-agglomerated particles in the polymer foam.

Further described herein is a latex-based adhesive, comprising co-agglomerated particles formed of at least one polymer and at least one inert material, the co-agglomerated particles having a particle size of 100 nm to 5 µm and the polymer derived from one or more monomers including at least one conjugated diene monomer. In some examples, the adhesive described herein can be used as a textile adhesive (e.g. a carpet adhesive). A method of adhering a substrate to a surface is also described, and comprises the steps of applying to a surface a co-agglomerated dispersion comprising co-agglomerated particles formed of at least one polymer and at least one inert material, the co-agglomerated particles having a particle size of 100 nm to 5 µm and the polymer derived from one or more monomers including at least one conjugated diene monomer; applying the substrate to the dispersion; and removing water from the dispersion. The method can further include the steps of co-agglomerating an anionic polymer dispersion, the polymer derived from one or more monomers including at least one conjugated diene monomer and in the presence of inert particles having a particle size of less than 2 µm to form the co-agglomerated dispersion. Also, the method can include the step of removing water from the co-agglomerated dispersion prior to applying it to the surface.

In yet another aspect, a modified asphalt composition is described comprising an asphalt emulsion and a co-agglomerated dispersion comprising co-agglomerated particles formed of at least one polymer and at least one inert material, said co-agglomerated particles having a particle size of 100 nm to 5 µm and said polymer derived from one or more monomers including at least one conjugated diene monomer. The asphalt emulsion can be used as a waterproofing membrane or a sound absorbing coating.

The details of one or more embodiments of the invention are set forth in the accompanying drawings and the description below. Other features, objects, and advantages of the invention will be apparent from the description and drawings, and from the claims.

DETAILED DESCRIPTION

Co-agglomerated latex polymer dispersions and methods for their preparation are described herein. The method for producing the co-agglomerated dispersion includes co-agglomerating an anionic polymer dispersion in the presence of inert particles having a particle size of less than 2 µm to form a co-agglomerated dispersion comprising the anionic polymer and particles.

The inert particles useful in the co-agglomerated dispersions described herein do not react with the polymer in the dispersion. For example, the inert particles described herein do not include sulfur which can react with the polymer in the dispersion in a vulcanization reaction. The inert particles useful in the co-agglomerated dispersions described herein can be inorganic particles and can include one or more clays. In addition, the inorganic particles described herein can include one or more particles having platelet structures, including, for example, kaolin, mica, bentonite, natural and synthetic hectorite (e.g. LAPONITE®, a synthetic hectorite commercially available from Rockwood Additives Limited, Cheshire, United Kingdom), ettringite, calcium phosphate, and mixtures thereof. Other particles can also be used in the invention such as tungsten oxide, carbon black, carbon nanoparticles, and calcium carbonate. The inert particles can have a particle size ranging from 50 nm to 2 μm.

The inert particles described herein can be added to the dispersion in solid form or provided in a slurry. In some embodiments, the slurry can have greater than 40% solids. Examples of the amount of inert particles present in the slurry described herein include greater than 45%, greater than 50%, greater than 55%, greater than 60%, greater than 65%, greater than 70%, or greater than 75%. Exemplary slurries include Kaolin HT (70% solids) and MIRAGLOSS 91® slurries, commercially available from BASF Corporation, Engelhard Division.

The inert particles for the co-agglomeration step can be provided in an amount of from about 1% to about 50% by weight based on the dry weight of the polymer. Further examples include from about 1.2% to about 40%, about 1.4% to about 35%, about 1.6% to about 30%, about 1.8% to about 25% by weight, about 2% to about 20% by weight, or about 3% to about 15%, or about 4% to about 12% (e.g. 5% or 10%) by weight based on the dry weight of the polymer.

The anionic polymer for use in the co-agglomerated dispersions described herein is derived from one or more monomers including at least one conjugated diene monomer (e.g. isoprene or 1,3-butadiene). In some examples, at least 50% of the monomers comprise the at least one conjugated diene. For example, 55%, 60%, 65%, 70%, 75%, 80%, 85%, 90%, 95% or 100% of the monomers can include the at least one conjugated diene. In some examples, the at least one conjugated diene monomer includes butadiene (1,3-butadiene). The polymer described herein can be a butadiene-based copolymer derived from one or more additional monomers or can be polybutadiene.

As mentioned above, the polymer can be derived from one or more monomers in addition to the conjugated diene (e.g. butadiene). In some embodiments, the one or more monomers include at least one vinyl aromatic monomer such as styrene, α-methylstyrene, o-chlorostyrene, and vinyltoluenes (e.g., styrene). For example, the polymer can be a styrene-butadiene-based copolymer derived from styrene, butadiene and optionally other monomers. The styrene-butadiene-based copolymer can include greater than 0% to less than 50% styrene and greater than 50% to less than 100% butadiene (e.g. 10-45% styrene/55-90% butadiene, 15-40% styrene/60-85% butadiene, e.g. 20-35% styrene/65-80% butadiene, or about 25% styrene/about 75% butadiene (by weight). The styrene-butadiene-based copolymer can include up to 25% additional monomers such as itaconic acid, (meth)acrylic acid, (meth)acrylic acid esters, (meth)acrylonitrile, and (meth)acrylamide.

In some embodiments, the one or more additional monomers can include at least one (meth)acrylic acid or (meth)acrylic acid ester in addition to or instead of the at least one vinyl aromatic monomer. For example, methyl, ethyl, n-butyl, isobutyl and 2-ethylhexyl acrylates and methacrylates can be used. In some embodiments, methyl methacrylate is used to form the polymer. The polymer can include methyl methacrylate as a substitute for all or a portion of the styrene in the percentages provided in the previous paragraph. For example, the polymer can be derived from greater than 50% to 99% butadiene and 1% to less than 50% methyl methacrylate or 1% to less than 50% styrene. In some embodiments the polymer can be derived from greater than 50%-99% butadiene, 1-49% methyl methacrylate and 1-49% styrene. In some embodiments, the $T_g$ of the polymer is greater than $-80°$ C. and less than $-10°$ C.

In addition, small amounts (e.g. from 0.01 to 1% by weight based on the total monomer weight) of molecular weight regulators, such as tert-dodecyl mercaptan. Such substances are preferably added to the polymerization zone in a mixture with the monomers to be polymerized and are considered part of the total amount of unsaturated monomers used in the copolymer.

The one or more monomers are polymerized to form the anionic polymer dispersion for use in the co-agglomerated dispersions described herein. In some examples, the one or more monomers are polymerized using emulsion polymerization to form the anionic polymer dispersion prior to the co-agglomerating step. The polymerizing step can occur at a temperature below room temperature. The polymer dispersion can have an average particle size of 200 nm or less or 100 nm or less (e.g. 20-100 nm).

The co-agglomeration of the anionic polymer dispersion and the inert particles can be carried out in a variety of ways known to those of skill in the art. The co-agglomerating step can include co-agglomerating the anionic copolymer dispersion and the slurry using, for example, freeze agglomeration, pressure agglomeration, mechanical agitation, or chemical agglomeration (i.e., by adding a chemical to the anionic copolymer dispersion and the slurry). These methods are described in detail in D. C. Blackley, "Polymer Latices: Science and Technology, Chapter 10.4, Agglomeration and Concentration of Synthetic Latices," Chapman & Hall, London, 1997 and D. C. Blackley, "High Polymer Latices, Chapter 3, Agglomeration and Concentration of Synthetic Latices," Maclaren, Palmerton, 1966. As used herein, the term "agglomeration" refers to processes for agglomerating particles including partially agglomerating particles to produce a latex having a greater average particle size and generally a broader particle size distribution. The term "co-agglomeration" refers to agglomeration processes such as those described above for agglomerating the polymer particles in the anionic dispersion and the inert particles. The co-agglomeration method can produce a latex with a high total solid content and a sufficiently low viscosity for use.

The polymer dispersion used in the co-agglomeration process is in the anionic form. The method of producing the co-agglomerated dispersion described herein can further include the step of adding a cationic surfactant to the co-agglomerated dispersion to make the polymer dispersion cationic. Cationic surfactants suitable for the methods described herein include, for example, REDICOTE® E-5 (Akzo Nobel, Chicago, Ill.), REDICOTE® E-11 (Akzo Nobel, Chicago, Ill.), REDICOTE® E-53 (Akzo Nobel, Chicago, Ill.), REDICOTE® E-606 (Akzo Nobel, Chicago, Ill.), REDICOTE® E-5127 (Akzo Nobel, Chicago, Ill.), ADOGEN® 477HG (Chemtura Corp., Greenwich, Conn.), INDULIN® W-1 (MeadWestvaco, Charleston, S.C.), INDULIN® W-5 (MeadWestvaco, Charleston, S.C.), INDULIN® SBT (MeadWestvaco, Charleston, S.C.), and INDULIN® MQK (MeadWestvaco, Charleston, S.C.).

The co-agglomerated particles result in a polymer dispersion of larger particles with a broader particle size distribution. The co-agglomerated particles as described herein have a particle size of 100 nm to 5 µm. For example, the particle size can range from 100 nm to 2 µm or from 200 nm to 1 µm.

The method of forming the co-agglomerated dispersion can include the step of removing water from the co-agglomerated dispersion to increase the solids content. For example, the co-agglomerated dispersion can be concentrated to produce a solids content of greater than 50% or greater than 60%. For example, the method of forming the co-agglomerated dispersion can include the step of removing water from the co-agglomerated dispersion to produce a solids content of greater than 50% to 75%, 55% to 72.5%, or 60% to 70%. The co-agglomerated dispersion, even once concentrated, can have a viscosity that allows it to readily flow (i.e. it does not gel). For example, an aqueous dispersion having a solids content greater than 60% can have a viscosity of less than 1 Pa·s at 20° C.

In some embodiments, an inorganic material, e.g., the inorganic material co-agglomerated with the polymer to form the co-agglomerated particles or another co-inorganic material, can be added to the co-agglomerated dispersion. If water is removed from the dispersion, the inorganic material can be added before or after the water is removed. The amount of inorganic material added to the co-agglomerated dispersion is generally less than the amount used to form the co-agglomerated particles, e.g., less than 20%, less than 10%, or less than 5% per weight, based on the dry weight of the polymer. In some embodiments, however, the inorganic material is only added prior to co-agglomeration of the polymer and the inorganic material, i.e., none of the inorganic material is post-added (added after co-agglomeration).

An aqueous dispersion including the co-agglomerated particles formed of at least one polymer and at least one inert material is also described herein. The co-agglomerated particles have a particle size of 100 nm to 5 µm. The polymer can be derived from one or more monomers including at least one conjugated diene monomer such as those described above. The inert particles can include the particles discussed above in the amount described.

The aqueous dispersion including the co-agglomerated particles can have a surface tension of less than 45 mN/m as measured using a du Nouy tensiometer according to the method described in ASTM D 1417-03a, which is incorporated herein by reference in its entirety. For example, the aqueous dispersion can have a surface tension of 45 mN/m or less, 40 mN/m or less, or 35 mN/m or less. The aqueous dispersion typically includes free surfactant (i.e. surfactant that is not interacting with the co-agglomerated particles because of the reduction in particle surface area as a result of the co-agglomeration of the polymer particles and the inert particles).

The aqueous dispersion can optionally include a cationic surfactant to make the aqueous dispersion cationic such as those described above. The solids content of the aqueous inert particles described herein can be greater than 50% as described above.

The inert particles can be used in the co-agglomerated dispersions described herein without pre-treating the inert particles with chemical modifiers or using layering methods (e.g., in situ polymerization, solution intercalation, melt intercalation, or coagulation). Further, the co-agglomerated dispersions described herein can be maintained as stable aqueous polymer dispersions and are thus suitable for a variety of applications. For example, the co-agglomerated dispersions can be useful in the preparation of several products, including foamed polymers, latex-based adhesives, asphalt emulsions including those used as waterproofing membranes, polymer films, sound absorbing compounds and textile (e.g. carpet) backing. The products prepared according to the methods described herein have increased tensile strength, elongation, and heat resistance as compared to polymer products prepared without co-agglomerated particles (i.e., exclusion of inert materials or particle addition of inert materials or particles to the final dispersion without co-agglomerating). The products prepared with the co-agglomerated particles described herein achieve significantly improved elongation without reducing the tensile strength. Generally, a polymer of lower tensile strength has a high elongation, but a stronger polymer has a limited elongation. The polymeric products including the co-agglomerated particles as described herein maintain the same or slightly higher tensile strength with significantly improved elongation as compared to polymeric products prepared without co-agglomeration of the particles.

Further, the inclusion of co-agglomerated particles produces a product that is less susceptible to the degradation of properties upon prolonged exposure to heat (i.e. heat aging). Heat aging can result in increased brittleness of the powder formation or can result in discoloration of the product as evidenced through a darkening of color. However, the products prepared as described herein are less affected by this process as evidenced in the maintenance of color, tensile strength, and elongation. In some examples, the tensile strength and elongation of the foams described herein do not change by more than 10% after the product has been heated at 140° C. for 3 hours.

The polymer products prepared according to this process have a better distribution of the inert material throughout the product compared to polymer products made by previous methods, particularly compared to polymer products prepared by post-adding an inorganic material to an agglomerated polymer dispersion. In particular, because the inert particles are co-agglomerated with the polymer particles, the inert particles are more uniformly distributed throughout the polymer product and are substantially uniformly distributed throughout the polymer product. In prior art methods where the polymer dispersion is agglomerated and the inert particles are later added, the inert particles tend to form around the surface of the agglomerated polymer particles as opposed to being uniformly distributed throughout the polymer product. Although not wishing to be bound by a particular theory, the substantially uniform distribution of the inert material also appears to result in a parallel orientation of the inert particles, particularly the inert particles in the form of platelets. This is evidenced by a uniform blue color when viewing a dried latex film including the co-agglomerated polymer under a cross-polarized optical microscope.

Foamed polymers, including an expanded foam comprising co-agglomerated particles formed of at least one polymer and at least one inert material, prepared according to the methods described herein display the improved mechanical properties described above. In particular, when a sufficient amount of the inert material is co-agglomerated with the dispersion, e.g., 10% by weight or more, 15% by weight or more, 20% by weight or more, 25% by weight or more, 30% by weight or more, 35% by weight or more, or 40% by weight or more, the foamed polymer can have improved mechanical properties such as compression resistance. The foamed polymers can be produced by co-agglomerating an anionic polymer dispersion to form a co-agglomerated dispersion comprising the anionic polymer and particles. The resultant dispersion can be used alone or with one or more additional latex dispersions. In some embodiments, the foamed polymers are based on styrene butadiene-based copolymer dispersions and can include co-agglomerated particles formed from styrene-butadiene copolymer particles and inert particles.

The foamed polymer can be produced by first introducing air or other gases into the latex by mechanical means (e.g. whipping or beating air into the latex) or by chemical means. The foam can then be molded or constrained to the shape which is desired for the final product. The foam can then be solidified or set by evaporating water from the foam or by gelling the foam. The foam can then be vulcanized by crosslinking the co-agglomerated particles.

The method of producing the foamed polymer can include the step of adding one or more foaming agents including foam promoters and foam stabilizers to the co-agglomerated dispersion. Foam promoters include, for example, carboxylate soaps (e.g., oleates, ricinoleates, castor-oil soaps and resonates), sulfates, sulfonates, ethoxylates (including non-ionogenic ethoxylates), and succinamates. Foam stabilizers useful for preparing the foamed polymers described herein include quaternary ammonium surface-active compounds and betaines, amino compounds and amine oxides, organic hydroxy compounds (e.g., phenols), and water-soluble hydrocolloids (e.g., proteinaceous substances). Gelling agents can also be added including alkali-metal silicofluorides, zinc oxide. Compositions to aid in the curing process, such as cure or vulcanizing pastes, can be added to the co-agglomerated dispersion. Vulcanizing pastes can be made from sulfur and/or zinc oxide dispersions, accelerators (e.g., diphenyl guanidine, zinc 2-mercaptobenzothiazole and zinc diethyldithiocarbamate), antioxidants, and water. Other additives can also be included including fillers (e.g., starches and resins), softeners (e.g., mineral oil), flame retardants, thickening agents, and anti-oxidants to facilitate in the formation of the foam.

The obtained foamable latex compound can be prepared by any process known to the person skilled in the art for making foamed articles. Suitable processes include the Dunlop process, the Talalay process, the Dow process, the Crown Rubber process, and the Revertex process. The foamed polymers can be used in automotive applications (e.g. dashboards, bumpers, and seats), furniture cushions, bedding (e.g. mattresses and pillows), clothing (e.g., garment padding), footwear (e.g., shaped parts of shoes and shoe inside soles), moldings, rubber sheeting, and the like.

Also described herein are latex-based adhesives and methods of their use and preparation. The latex-based adhesives can be used to bond surfaces including metal, ceramic, plastic, paper, leather, wood, textile, and glass surfaces. The latex-based adhesives include co-agglomerated particles formed of at least one polymer and at least one inert material and can be based on one or more additional latex dispersions. In some embodiments, the latex-based adhesives are based on styrene butadiene-based copolymer dispersions and can include co-agglomerated particles formed from styrene-butadiene copolymer particles and inert particles. The mechanical properties of the adhesives described herein, including tensile strength, elongation, and heat resistance, are improved as compared to adhesives prepared without the co-agglomerated particles and thus make them suitable for various applications including flooring applications.

The co-agglomerated dispersion comprising co-agglomerated particles formed of at least one polymer and at least one inert material as described herein can be applied to a surface, a substrate to be bonded to the surface can be applied to the dispersion; and water removed from the dispersion to facilitate bonding. Water can be removed from the co-agglomerated dispersion prior to applying it to the surface.

In some embodiments, the latex based adhesives can be flooring adhesives and the substrate can be flooring to be bonded to the underlying surface. For example, the flooring adhesives described herein can be used for adhering carpet, hardwood floors, tiles, and other flooring to an underlying surface.

The method of producing the adhesives can include the step of adding an additive to the co-agglomerated dispersion. For example, adhesion modifiers (e.g., tackifiers and cooked or uncooked starches), plasticizers, crosslinking agents, fillers, extenders, binders, and thickeners can be added to improve the adherence of the adhesive as known by a person skilled in the art. Other additives that are suitable for inclusion in the adhesives described herein include, for example, antioxidants, surfactants, anti-foaming agents, anti-freeze agents, freeze-thaw stabilizers, fungicides, corrosion inhibitors, flame retardants, colorants, deodorants, and reodorants.

In some embodiments, a modified asphalt emulsion is produced by combining an asphalt emulsion with the a co-agglomerated dispersion of co-agglomerated particles formed of at least one polymer and at least one inert material. The asphalt emulsion can be used as a waterproofing membrane and applied as a film to protect substrates, particularly those used in building materials, such as cement, concrete, wet concrete, wet cement, gypsum, plaster, masonry, chipboard, hardboard, drywall, wood, ceramics, marble, stone, and tile from moisture. The substrates can include various materials including Portland cement, fillers and other known components, and can be reinforced using, for example, metal components. The asphalt emulsion can also be used to produce a sound absorbing coating such as those used in vehicles.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention. Parts and percentages are provided on a per weight basis except as otherwise indicated.

EXAMPLES

Example 1 and Comparative Examples 1-3

BUTONAL® NS103 (BASF Corporation, Florham Park, N.J.) is a cold polymerized poly(styrene-butadiene) latex of approximately 25% styrene and 75% butadiene and 45-47% solids. The latex has a viscosity of 100-300 mPa·s, a surface tension of above 50 mN/m, and a particle diameter below 100 nm.

BUTONAL® NS103 and a sufficient amount of a Kaolin HT clay slurry commercially available from BASF Corp., Engelhard Division (70 weight % clay) to provide 5% kaolin clay in the dispersion (based on the weight of the dry polymer) were frozen at −20° C. for 24 hours, and thawing of this frozen sample resulted in production of a co-agglomerated latex (Example 1) having a broad size distribution ranging from 100 nm to below 5 μm in diameter, and the surface tension and viscosity of the latex dispersion was 30-35 mN/m and below 20 mPa·s after the freeze-agglomeration. The agglomeration of BUTONAL® NS103 and the kaolin clay slurry caused significant reduction in the total surface area of the latex particles in the dispersion, which resulted in an increase in the surfactant coverage on the latex particles, thus improving the dispersion stability. The reduction in the latex surface area also resulted in an increase in the free surfactant in the water phase of the latex dispersion and thus a reduction in the surface tension of the latex dispersion.

Comparative Example 1 was prepared by post-adding an appropriate amount of a 70 weight % of Kaolin HT slurry (BASF Corp., Engelhard Division) into BUTONAL® NS103 to produce a latex sample containing 5 weight % of kaolin clay.

A formulation was prepared by pressure agglomerating BUTONAL® NS103 without the presence of the kaolin clay slurry and resulted in a latex having a broad size distribution ranging from 100 nm to below 5 μm in diameter. The agglomerated latex had a lower surface tension value of 30-35 mN/m, and the broad size distribution of this agglomerated latex allows maintaining a relatively low viscosity of below 2 Pa·s after removing water and concentrating to approximately 70% solids. The resultant latex is Comparative Example 2.

Comparative Example 3 was prepared by post-adding an appropriate amount of a 70 weight % of Kaolin HT slurry (BASF Corp., Engelhard Division) into Comparative Example 2 to produce a latex sample containing 5 weight % of kaolin clay.

Figure 1A:
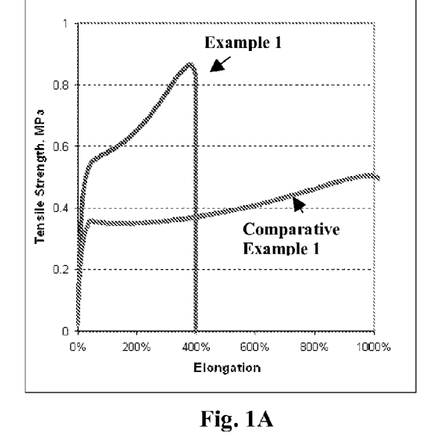
FIG. 1A is a graph illustrating the tensile strength vs. elongation of a styrene-butadiene-based latex dispersion with clay co-agglomerated and a styrene-butadiene-based latex dispersion with the post-addition of clay to the latex dispersion without agglomeration.
Figure 1B:
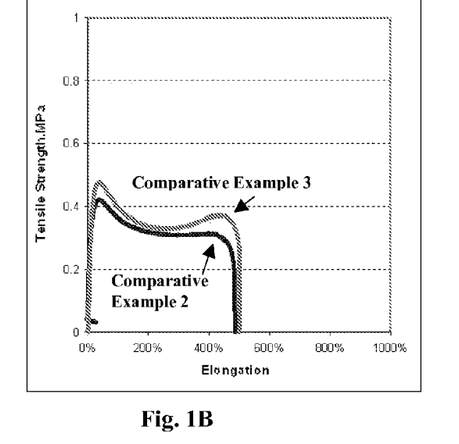
FIG. 1B is a graph illustrating the tensile strength vs. elongation of a styrene-butadiene-based latex dispersion without clay and a styrene-butadiene-based latex dispersion with the post-addition of clay.

Preparation of Latex Films and Tensile Strength and Elongation Measurements:

Latex Films for Formulation Example 1 and Comparative Examples 1-3 were prepared by drying at room temperature for 3 days, and then cured at 60° C. for an additional day. The resultant latex films were approximately 200-300 μm thick and were cut to prepare a rectangular specimen approximately 1.2 cm wide and 2.5 cm long. The tensile vs. elongation property of the latex films were measured by Instron (Instron Corp., Norwood, Mass.) at room temperature. The tensile vs. elongation property of the latex films were compared in FIGS. 1A and 1B. These results demonstrated that the post-addition of kaolin clay into the non-agglomerated latex resulted in improved elongation of the latex film without improving the maximum tensile strength. In comparison, the 5% clay freeze-agglomerated BUTONAL® NS103 showed nearly a 2× increase in the maximum tensile strength against pressure agglomerated latexes (with 0 and 5% clay post added) without losing the maximum elongation. Even though the mechanical properties of BUTONAL® NS103 improved with post-addition of the clay slurry, this latex has a low solids content and limited dispersion stability. In contrast, the clay freeze co-agglomerated BUTONAL® NS103 can be concentrated to produce a latex of nearly 70% solids due to its broad size distribution, and provide similar dispersion stability as Comparative Example 2.

Example 2 and Comparative Example 4

Figure 2:
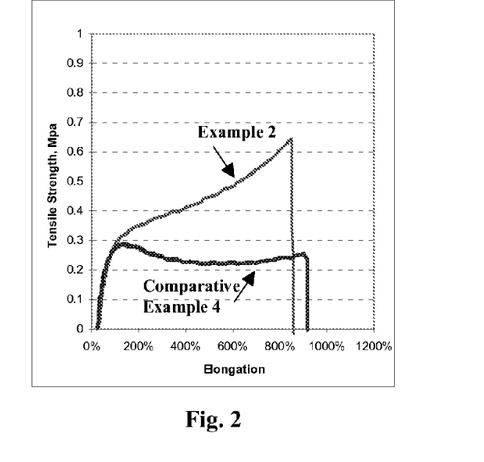
FIG. 2 is a graph illustrating the tensile strength vs. elongation of a styrene-butadiene-based latex dispersion without clay and a styrene-butadiene-based latex dispersion with clay co-agglomerated.

A freeze co-agglomerated dispersion (Example 2) was prepared in the same manner as in Example 1 except that Kaolin HT clay is provided to produce 2% kaolin clay in the dispersion. Comparative Example 4 was prepared solely from the freeze agglomerated BUTONAL® NS103 with no clay addition. Latex films including Example 2 and Comparative Example 4 were prepared as discussed above. The latex film based on Example 2 and the latex film based on Comparative Example 4 were prepared by drying at room temperature for 10 days and the tensile strength and elongation were measured without curing at 60° C. for 24 hours. The tensile strength vs. elongation behavior of these latex films was compared. An approximate 2× increase in the maximum tensile strength without reducing the maximum elongation was shown using the 2% Kaolin HT co-agglomeration of Example 2 as shown in FIG. 2.

Examples 3-4

Figure 3A:
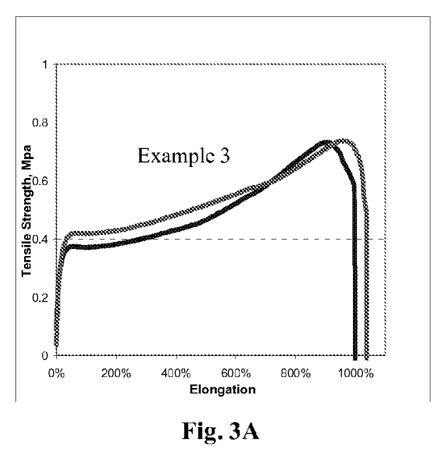
FIG. 3A is a graph illustrating the tensile strength vs. elongation of a styrene-butadiene-based latex dispersion co-agglomerated with 5% clay. The separate traces represent independent trials.
Figure 3B:
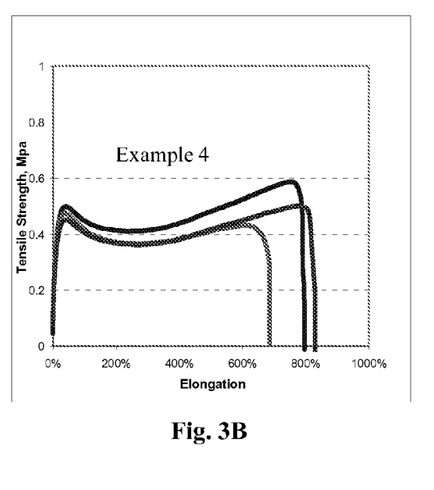
FIG. 3B is a graph illustrating the tensile strength vs. elongation of a styrene-butadiene-based latex dispersion co-agglomerated with 10% clay. The separate traces represent independent trials.

BUTONAL® NS103 was freeze co-agglomerated using the process described in Example 1 except in the presence of 5 and 10 weight % of MIRAGLOSS® 91 (BASF Corp., Engelhard Division) resulting in Examples 3 and 4, respectively. The latex film was dried and cured as described in Example 1. Improvement in the maximum tensile strength as well as the maximum elongation was observed with these MIRAGLOSS® 91 co-agglomerated latex films as shown in FIGS. 3A and 3B. The reproducibility of the tensile strength vs. elongation measurements of these latex films was also demonstrated by testing Examples 3 and 4 more than once in these figures.

Figure 4A:
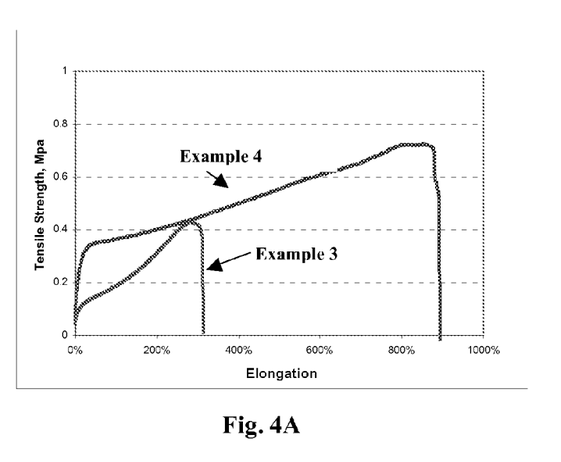
FIG. 4A is a graph illustrating the tensile strength vs. elongation of a styrene-butadiene-based latex dispersion co-agglomerated with clay after heat aging.
Figure 4B:
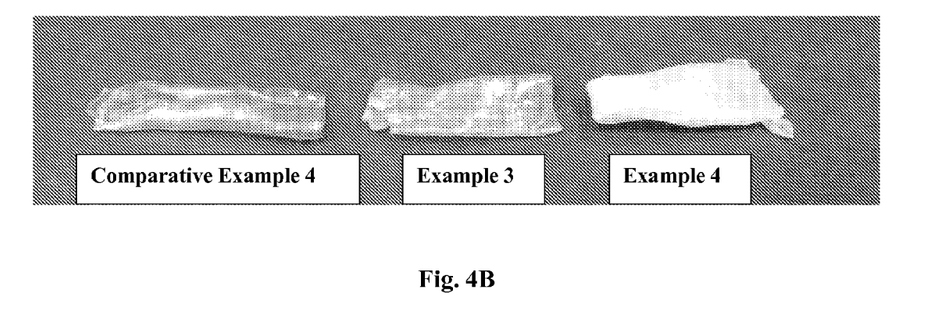
FIG. 4B is a photograph of a heat aged styrene-butadiene-based latex dispersion latex film without clay and styrene-butadiene-based latex dispersion latex films co-agglomerated with clay.

The latex films for Formulation Examples 3 and 4 were prepared as described above. After curing at 60° C. for 24 hours, these latex films and Comparative Example 4 were heat aged at 140° C. for 3 hours. The film based on Comparative Example 4 was very sensitive to the heat aging due to its high butadiene content, and became dark brown in color as shown in FIG. 4B and was very brittle, thus preventing the tensile strength vs. elongation measurement. The latex film prepared from Example 3 was lighter in color than the film based on Comparative Example 4 as shown in FIG. 4B, but only had limited mechanical strength as demonstrated in FIG. 4A. The latex film prepared according to Example 4 showed only limited degree of discoloration after the heat aging process as shown in FIG. 4B, and maintained the same or even improved tensile strength vs. elongation behavior than before the heat aging (FIG. 3B vs. FIG. 4A). The results demonstrated that the clay co-agglomeration process improved the mechanical strength of the BUTONAL® NS103 films and also reduced the heat aging properties.

Examples 5-6 and Comparative Example 5

BUTONAL® NS103 was pressure co-agglomerated with an elemental sulfur dispersion containing an optimized type and amount of the vulcanization reaction accelerating agent described in U.S. Pat. Nos. 6,127,461; 6,300,392; and 6,348,525, which are incorporated herein by reference in their entirety. The co-agglomerated latex was further concentrated to 70% solids, and the resultant latex is Comparative Example 5.

Figure 5:
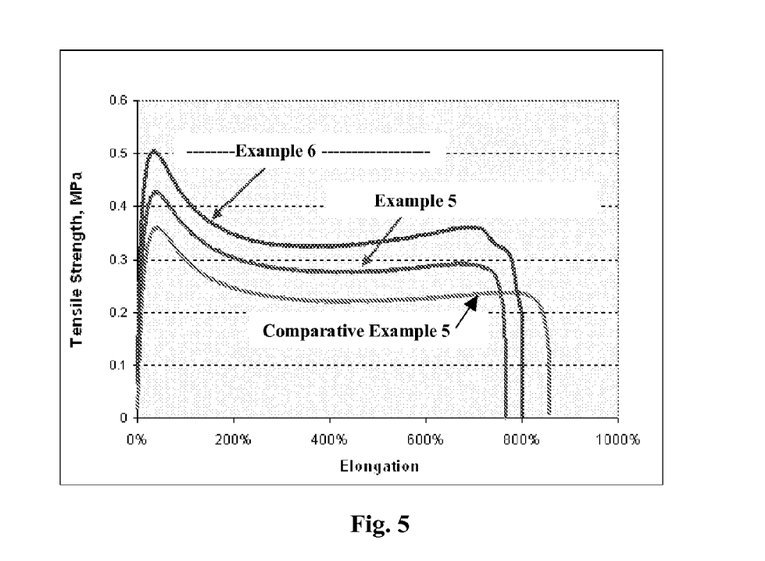
FIG. 5 is a graph illustrating the tensile strength vs. elongation of a styrene-butadiene-based latex dispersion without clay and a styrene-butadiene-based latex dispersion co-agglomerated with clay after heat aging.

BUTONAL® NS103 was freeze co-agglomerated in the presence of 5 and 10 weight % of MIRAGLOSS® 91 together with the elemental sulfur dispersion described above resulting in Examples 5 and 6, respectively. Latex films based on Example 5, Example 6 and Comparative Example 5 were prepared using the procedure described in Example 1 and cured at 100° C. for 3 hours. The tensile strength vs. elongation behavior of these latex films were compared in FIG. 5. These results demonstrated improved mechanical properties of the clay co-agglomerated latex films.

Comparative Example 6

Figure 6:
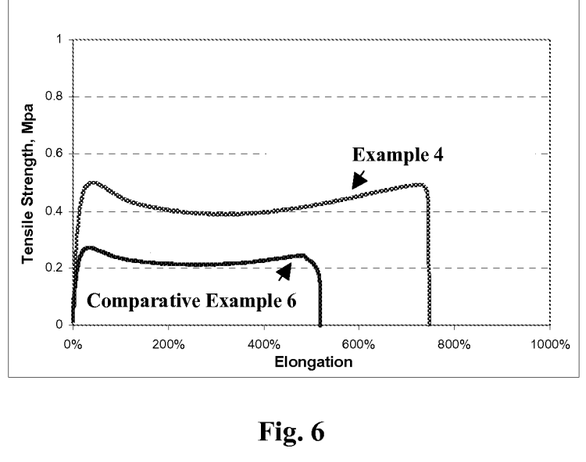
FIG. 6 is a graph illustrating the tensile strength vs. elongation of a styrene-butadiene-based latex dispersion with clay co-agglomerated and a styrene-butadiene-based latex dispersion with the post-addition of clay.

Comparative Example 6 was prepared in the manner described for Comparative Example 3 except that 10% MIRAGLOSS® 91 was post-added into the co-agglomerated dispersion instead of 5% Kaolin HT and a latex film was prepared as described in Example 1. A film based on Example 4 was also prepared using the same procedure. After 24 hours of curing at 60° C., both films were further cured at 100° C. for 3 hours and the tensile vs. elongation behavior was tested as shown in FIG. 6. The measured tensile vs. elongation relationships shown in FIG. 6 demonstrate the improved mechanical properties of the latex film prepared from the freeze-agglomerated latex.

Example 7

Figure 7:
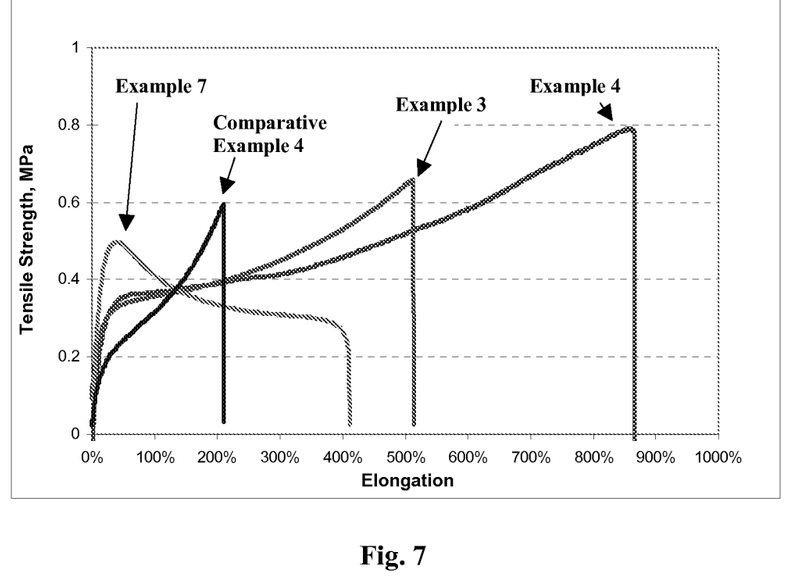
FIG. 7 is a graph illustrating the tensile strength vs. elongation of a styrene-butadiene-based latex dispersion without clay and styrene-butadiene-based latex dispersions co-agglomerated with either clay or calcium carbonate.

Example 7 was prepared according to procedure used for Examples 3 and 4, except that 5% ground calcium carbonate (HYDROCARB® 90, Omya, Inc., Proctor, Vt.) was used instead of kaolin clay (MIRAGLOSS® 91). Latex films were prepared based on Comparative Example 4 and Examples 3, 4, and 7 based on the procedures described in Example 1. After curing at 60° C. for 24 hours, the tensile vs. elongation behavior of the latex films were determined. As shown in FIG. 7, Example 7 nearly doubled the maximum elongation at break without affecting the maximum strength. The latex films prepared from Examples 3-4 demonstrated improvement in both the maximum tensile strength as well as elongation. Further improvement on the mechanical strength was demonstrated in Example 4.

Examples 8-10 and Comparative Example 7

Figure 8:
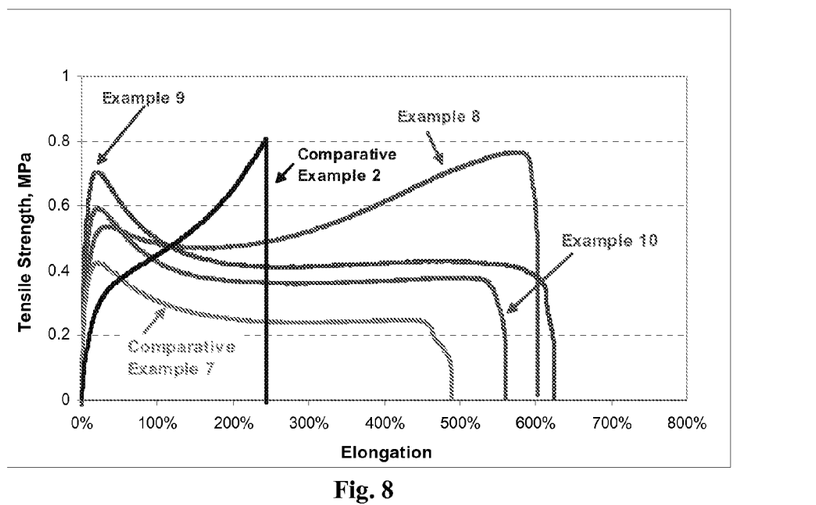
FIG. 8 is a graph illustrating the tensile strength vs. elongation of a styrene-butadiene-based latex dispersion without clay, styrene-butadiene-based latex dispersions co-agglomerated with clay, a styrene-butadiene-based latex dispersion with the clay post-added, and a styrene-butadiene-based latex dispersion with clay co-agglomerated and post-added.

Examples 8 and 9 were prepared according to the procedure used for Examples 3 and 4, except in the presence of 20 and 40 weight % of MIRAGLOSS® 91, respectively. Example 10 was prepared according to a similar procedure as Example 8, except that 20 weight % of MIRAGLOSS® 91 was post-added to the latex sample in addition to the 20 weight % of co-agglomerated clay. Comparative Example 7 was prepared by post-adding an appropriate amount of a 70 weight % of Kaolin HT slurry into BUTONAL® NS103 to produce a latex sample containing 40 weight % of kaolin clay. Latex films were prepared for Examples 8-10 and Comparative Examples 2 and 7 based on the procedures described in Example 1. After curing at 60° C. for 24 hours, the tensile vs. elongation behavior of the latex films were determined. The tensile strength vs. elongation behavior of these latex films were compared in FIG. 8. These results demonstrated improved mechanical properties of the clay co-agglomerated latex films as compared to the post-added clay latex films.

Figure 9:
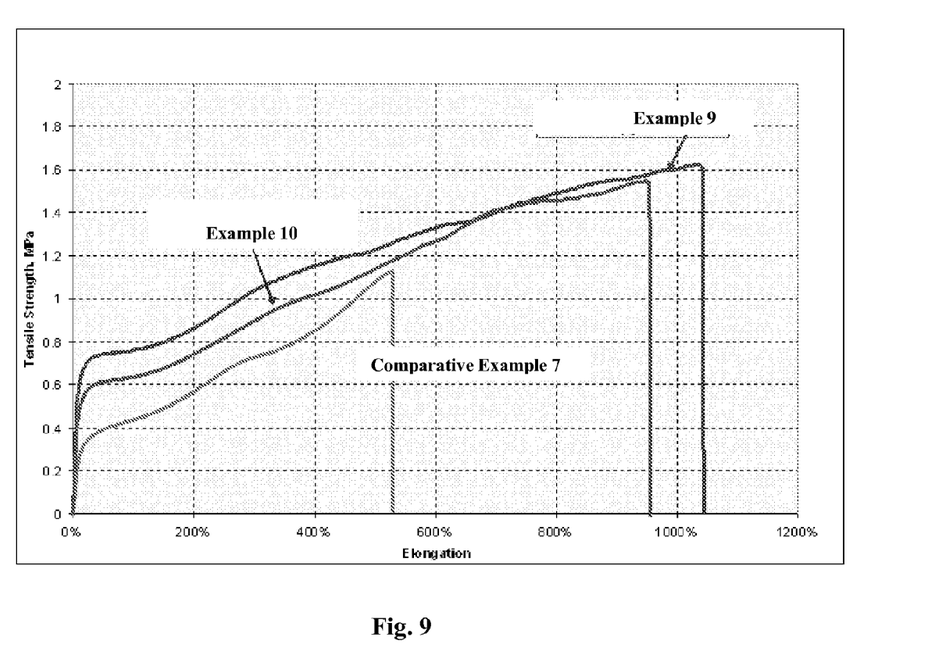
FIG. 9 is a graph illustrating the tensile strength vs. elongation of a styrene-butadiene latex dispersion co-agglomerated with clay, a styrene-butadiene-based latex dispersion with the clay post-added, and a styrene-butadiene-based latex dispersion with clay co-agglomerated and post-added after heat aging.

The latex films prepared from Example 9, Example 10, and Comparative Example 7 were further cured at 130° C. for 30 minutes and the tensile vs. elongation behavior was tested as shown in FIG. 9. The measured tensile vs. elongation relationships shown in FIG. 9 demonstrate the improved mechanical properties of the latex film prepared from the co-agglomerated latex samples.

Example 11 and Comparative Examples 8 and 9

The latex sample as described in Comparative Example 2 was compounded according to the procedure as follows to prepare the adhesive samples. The pH of Comparative Example 2 was raised to 12.5-13.0 using 10% KOH. The mixture was then warmed to 35° C. and agitated. A molten resin-oil mix including 179 g Tufflo 1200 (Citgo; Houston, Tex.), 146 g Neville LX-1200 (Neville Chemical Co.; Pittsburgh, Pa.), and 33 g Melhi resin (Eastman Chemical Company; Kingsport, Tenn.), was slowly added to the latex mixture. Tufflo 1200 is a plasticizer composed of naphthenic process oils. LX 1200 is a petroleum hydrocarbon resin useful as an extender. Melhi is a thermoplastic acidic resin binder that serves as a binder or tackifier. The pH was adjusted to 11.0-12.0 with 10% KOH. After agitating for 2 minutes, the mixture was allowed to cool. After cooling, a light-brown homogeneous adhesive latex mixture resulted with 81.3% solids content and a viscosity of 28 Pa·s (Comparative Example 8).

Comparative Example 9 was prepared by pre-adding an appropriate amount of MIRAGLOSS® 91 into Comparative Example 2 to produce a latex sample containing 10 wt % of clay. The resulting adhesive latex mixture was a light-brown homogeneous adhesive latex mixture with 79.2% solids content and a viscosity of 20 Pa·s.

BUTONAL® NS103 was pressure co-agglomerated with 10 wt % MIRAGLOSS® 91 clay and concentrated to 70% solids by removing water (Example 11). An adhesive latex mixture including Example 11 was prepared according to the procedure described for Comparative Example 8. The resulting adhesive latex mixture was a light-brown homogeneous adhesive latex mixture with 79.0% solids content and a viscosity of 27 Pa·s.

Figure 10:
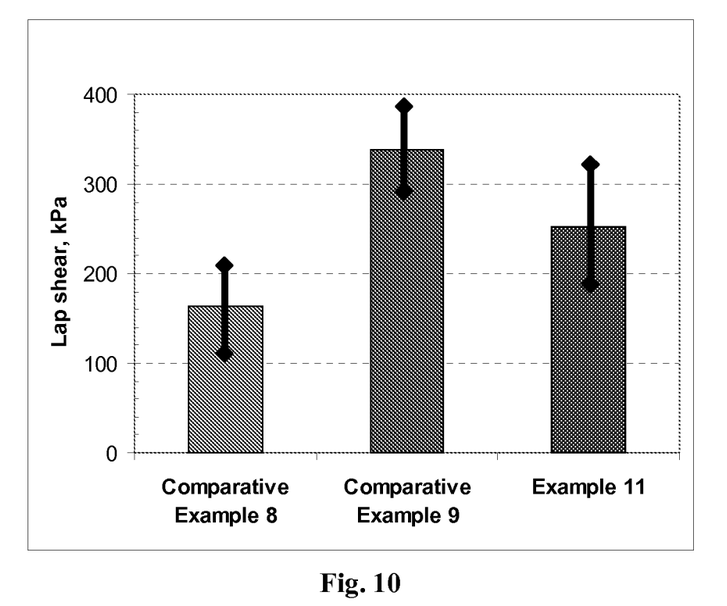
FIG. 10 is a graph illustrating the lap shear of an adhesive without clay, an adhesive with the post-addition of clay, and an adhesive co-agglomerated with clay.
Figure 11:
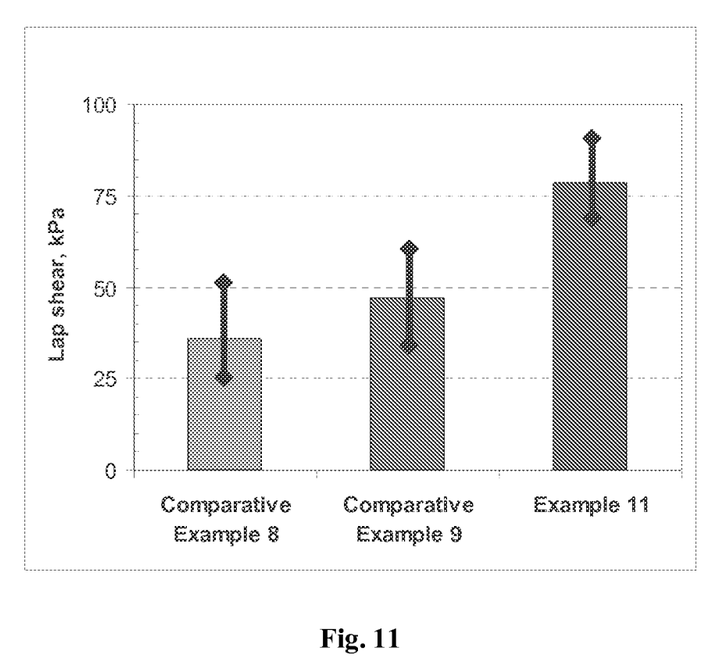
FIG. 11 is a graph illustrating the lap shear of an adhesive without clay, an adhesive with the post-addition of clay, and an adhesive co-agglomerated with clay after heat aging.

Each of the adhesive latex mixtures were applied individually to plywood, and a piece of hardwood was pressed down onto the adhesive latex mixture to form the test assemblies. Half of the test assemblies were allowed to dry for 14 days at room temperature, while the other half were allowed to dry for 14 days at 50° C. The lap shear of the adhesive latex mixtures for Example 11 and Comparative Examples 8 and 9 were measured by lift tests (ASTM D 907-96a). The lift tests were conducted by forcing the hardwood pieces up to a 90° angle using an Instron instrument (Instron Corp., Norwood, Mass.) at room temperature. The lap shear property of the adhesive latex mixtures were compared in FIGS. 10 and 11. These results demonstrated that co-agglomerated adhesive latex (Example 11) has superior adhesive properties at elevated temperatures over adhesives without clay and adhesives with clay added but that are not co-agglomerated.

The composites and methods of the appended claims are not limited in scope by the specific composites and methods described herein, which are intended as illustrations of a few aspects of the claims and any composites and methods that are functionally equivalent are intended to fall within the scope of the claims. Various modifications of the composites and methods in addition to those shown and described herein are intended to fall within the scope of the appended claims. Further, while only certain representative composite materials and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term comprising and variations thereof as used herein is used synonymously with the term including and variations thereof and are open, non-limiting terms. Although the terms comprising and including have been used herein to describe various embodiments, the terms consisting essentially of and consisting of can be used in place of comprising and including to provide for more specific embodiments of the invention and are also disclosed.

What is claimed is:

1. A method for producing a co-agglomerated latex dispersion, comprising:
co-agglomerating an anionic polymer dispersion in the presence of inert particles having a particle size of less than 2 µm, wherein the anionic polymer dispersion comprises a polymer comprising a conjugated diene monomer; and
adding a cationic surfactant to the co-agglomerated dispersion, thereby making the polymer dispersion cationic,
wherein co-agglomerated particles of the co-agglomerated latex dispersion have a particle size of from 100 nm to 5 µm,
and wherein the inert particles are inorganic particles comprising clay.

2. The method of claim 1, wherein the inorganic particles comprise a particle with a platelet structure.

3. The method of claim 1, wherein the inorganic particles comprise an inorganic particle comprising at least one material selected from the group consisting of kaolin, mica, bentonite, natural hectorite, synthetic hectorite, ettringite, and calcium phosphate.

4. The method of claim 3, wherein the inorganic particles comprise an inorganic particle comprising kaolin.

5. The method of claim 1, wherein the inert particles are in a slurry prior to co-agglomerating.

6. The method of claim 1, wherein a content of the inert particles is from 1% to 50% by weight based on the dry weight of the polymer.

7. The method of claim 1, wherein at least 50% of monomers in the polymer comprise a conjugated diene.

8. The method of claim 1, wherein the conjugated diene monomer comprises butadiene.

9. The method of claim 1, wherein the polymer comprises a vinyl aromatic monomer.

10. The method of claim 9, wherein the vinyl aromatic monomer comprises styrene.

11. The method of claim 10, wherein the polymer is a copolymer comprising styrene and butadiene.

12. The method of claim 1, wherein the polymer comprises a (meth)acrylic acid ester.

13. The method of claim 12, wherein the (meth)acrylic acid ester comprises methyl methacrylate.

14. The method of claim 1, wherein the polymer is polybutadiene.

15. The method of claim 1, further comprising:
polymerizing a monomer in an emulsion polymerization, to obtain the anionic polymer dispersion, prior to co-agglomerating.

16. The method of claim 15, wherein a temperature of the emulsion polymerization is below 20° C.

17. The method of claim 1, further comprising removing water from the co-agglomerated latex dispersion to obtain a co-agglomerated latex dispersion with a solids content of greater than 50%.

18. The method of claim 1, further comprising removing water from the co-agglomerated latex dispersion to obtain a co-agglomerated latex dispersion with a solids content of greater than 60%.

19. The method of claim 1, wherein co-agglomerating comprises co-agglomerating the anionic polymer dispersion and the inert particles by freeze agglomeration.

20. The method of claim 1, wherein co-agglomerating comprises co-agglomerating the anionic polymer dispersion and the inert particles by pressure agglomeration.

21. The method of claim 1, wherein co-agglomerating comprises co-agglomerating the anionic polymer dispersion and the inert particles by adding a chemical to the anionic polymer dispersion and the inert particles.

* * * * *